C. B. STEELE.
PASSENGER CAR.
APPLICATION FILED MAR. 24, 1917.
1,260,473.
Patented Mar. 26, 1918.
10 SHEETS—SHEET 1.
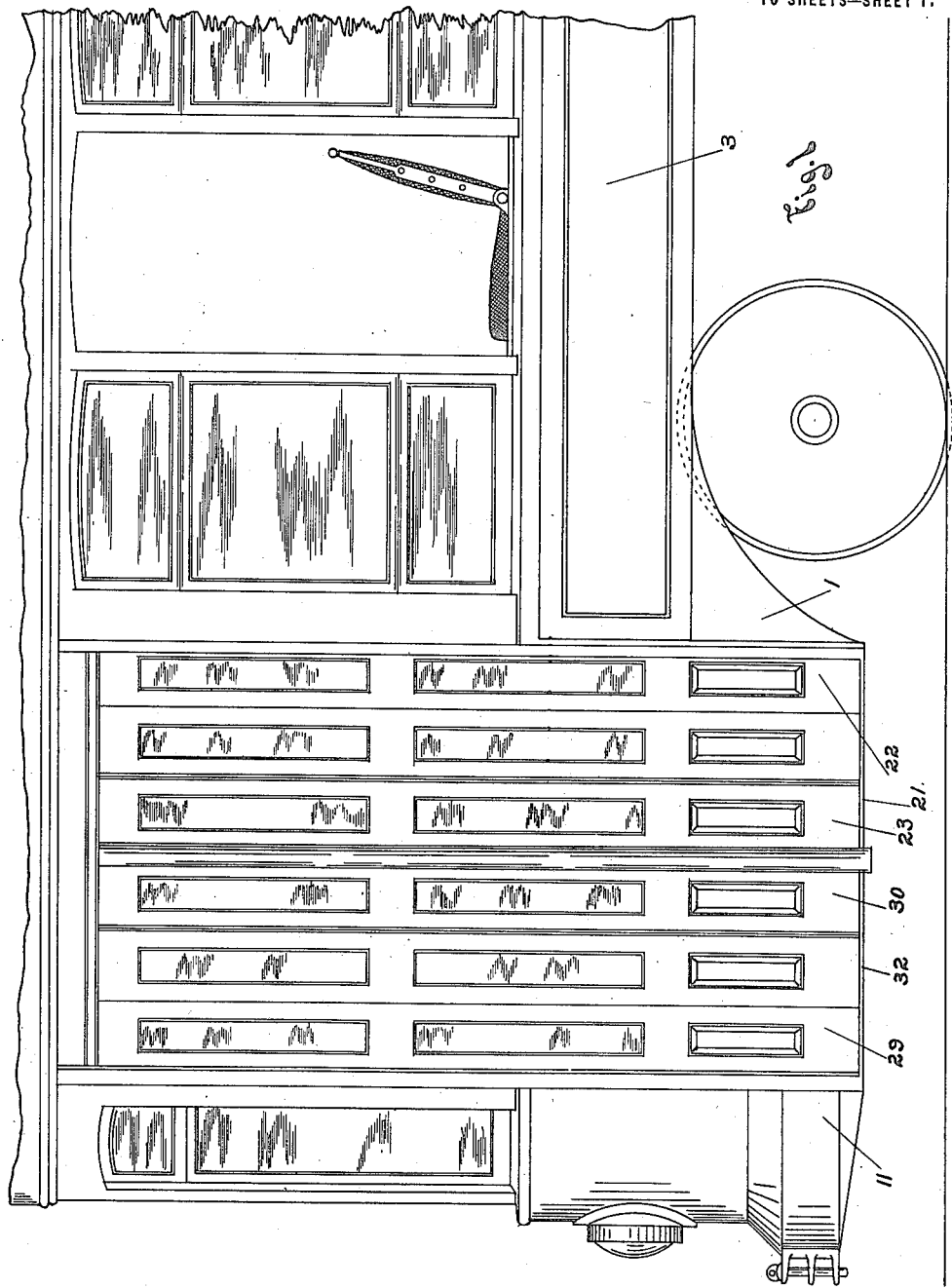

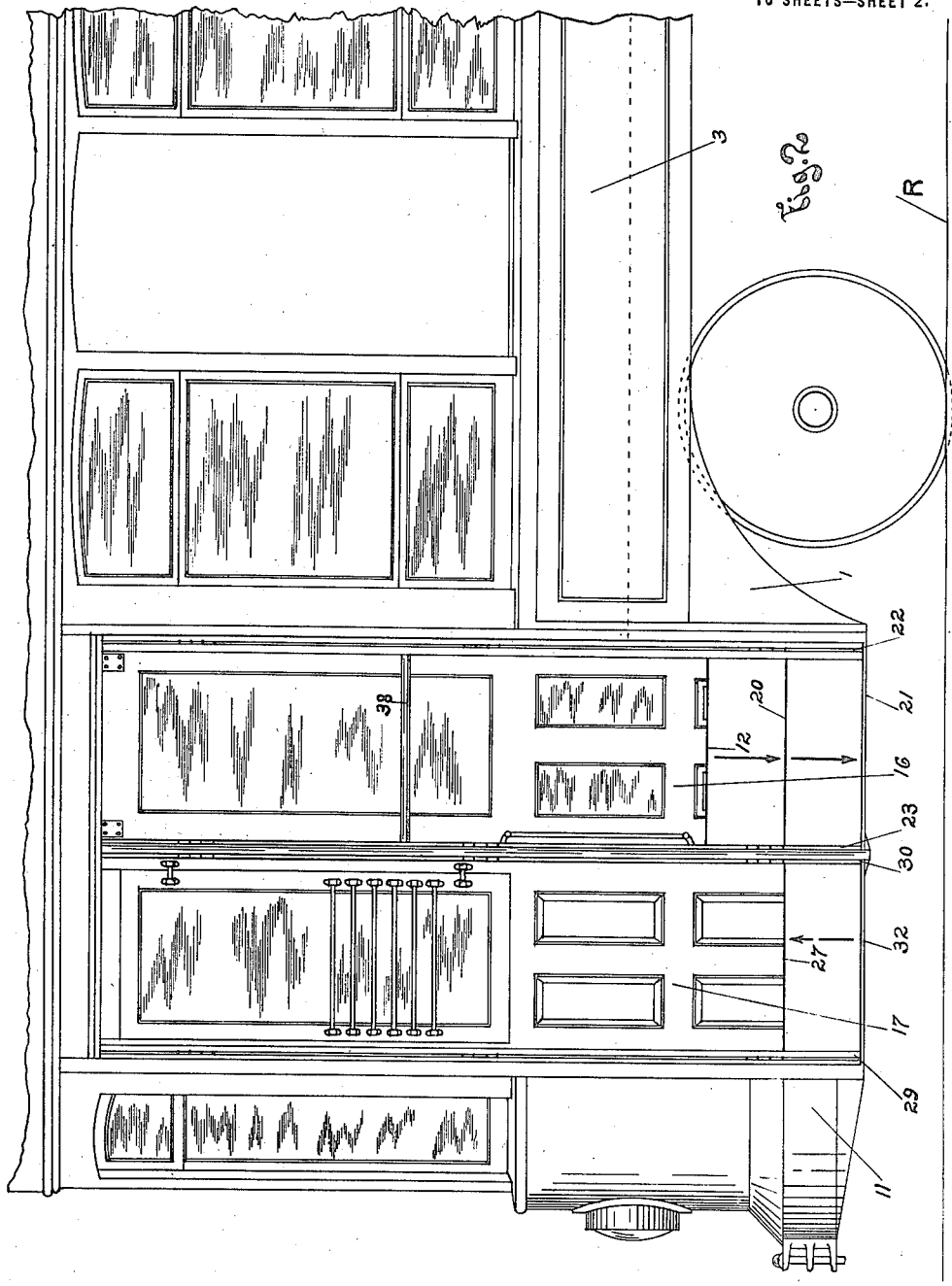

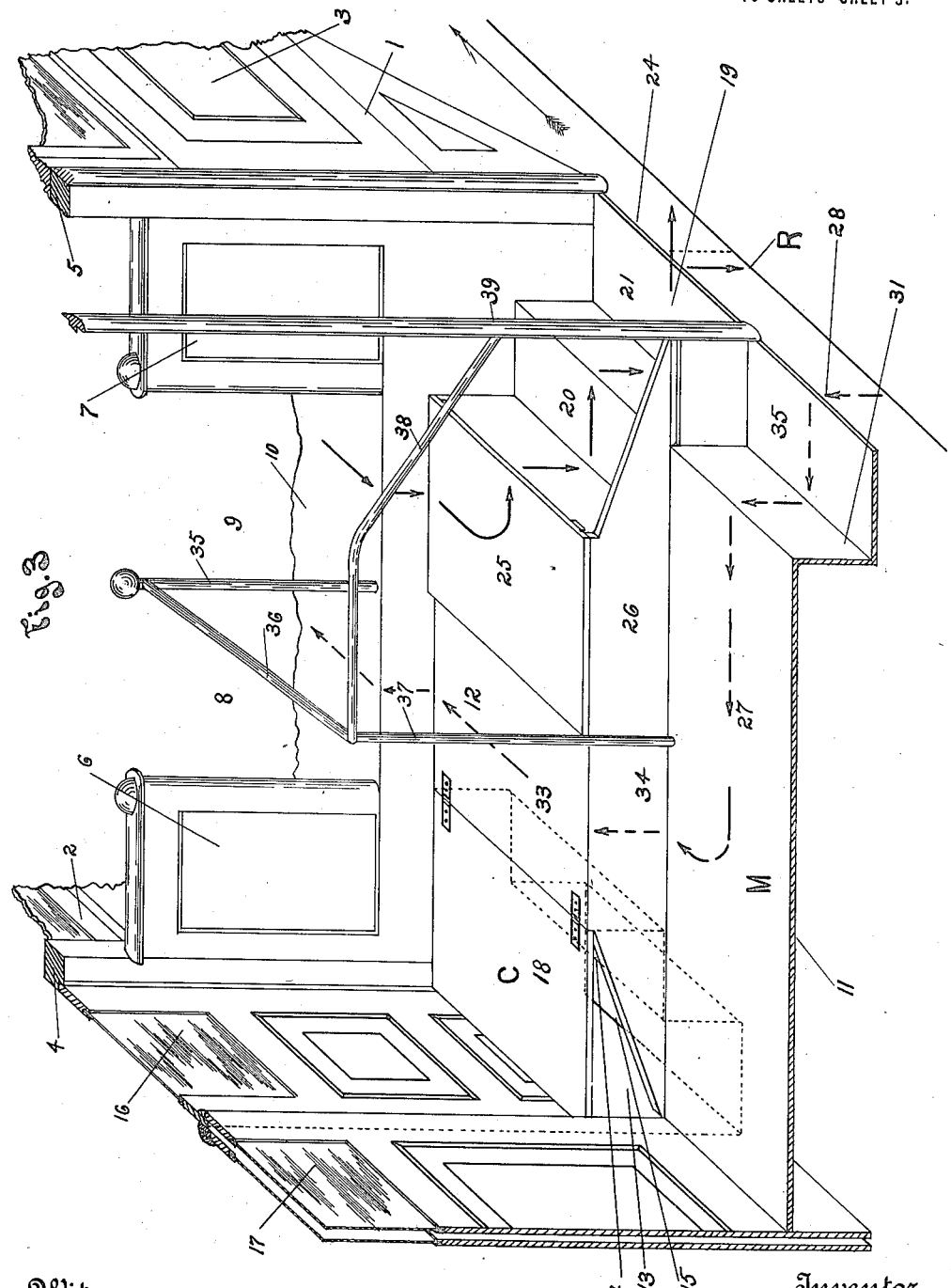

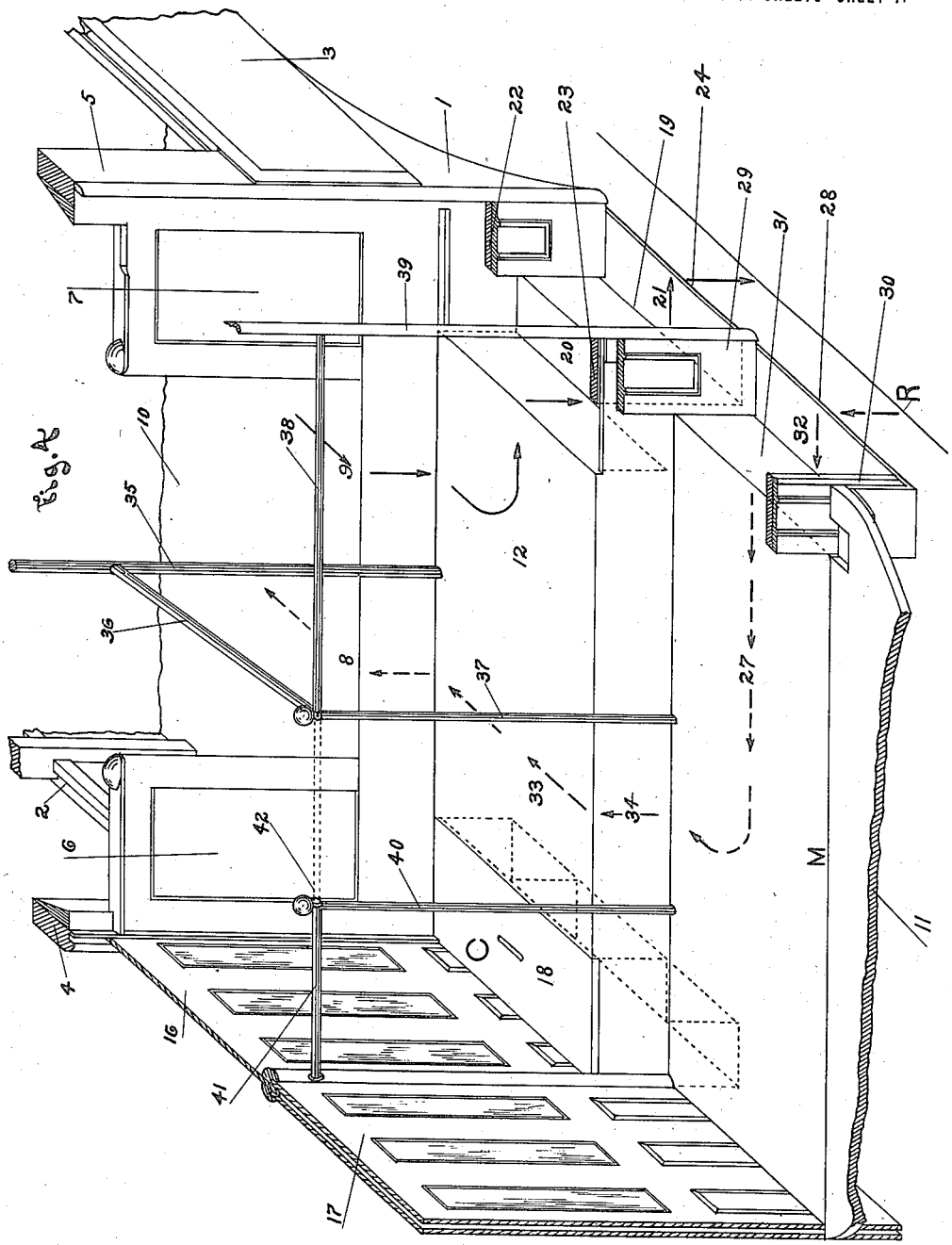

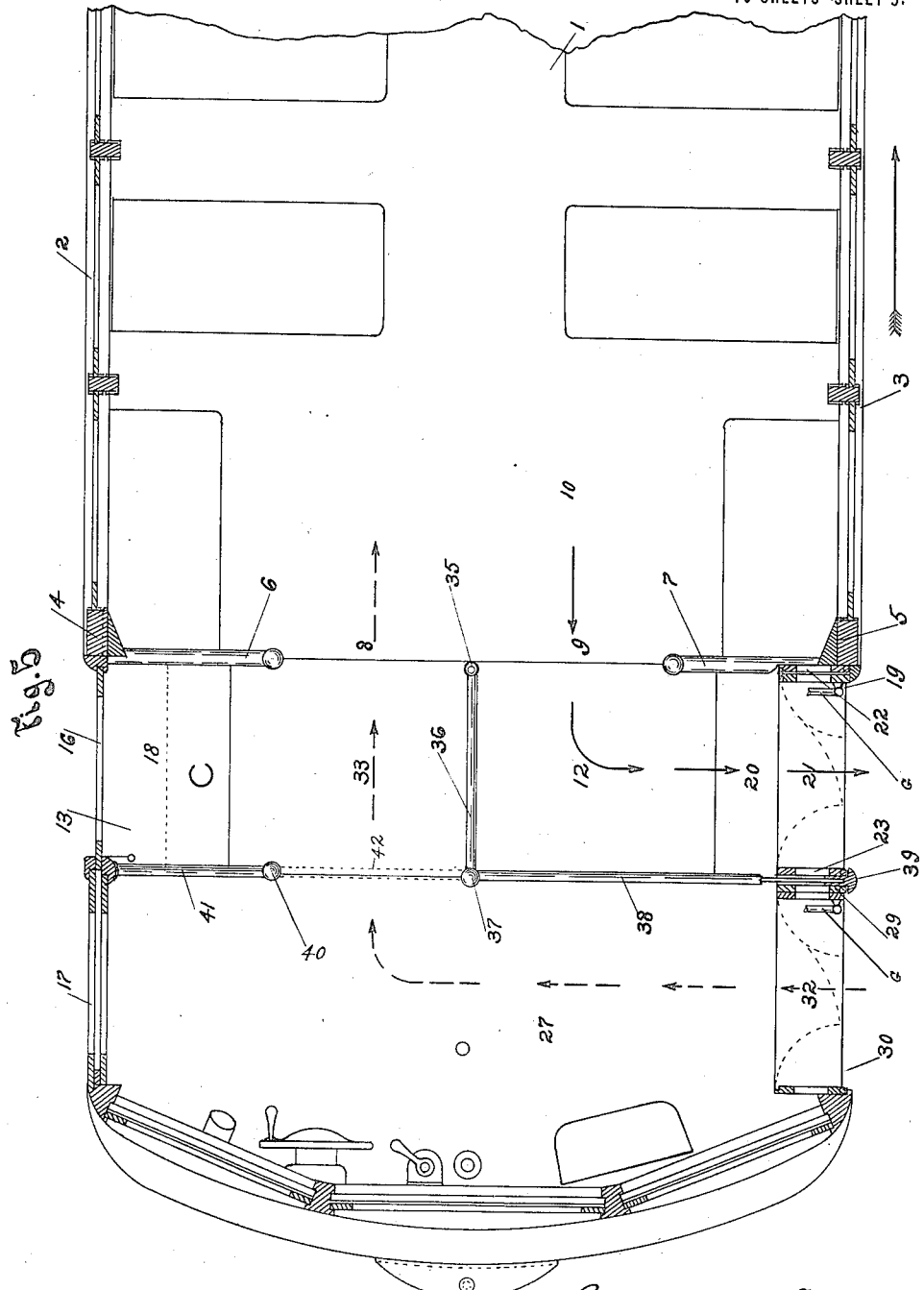

C. B. STEELE.
PASSENGER CAR.
APPLICATION FILED MAR. 24, 1917.
1,260,473.
Patented Mar. 26, 1918.
10 SHEETS—SHEET 6.
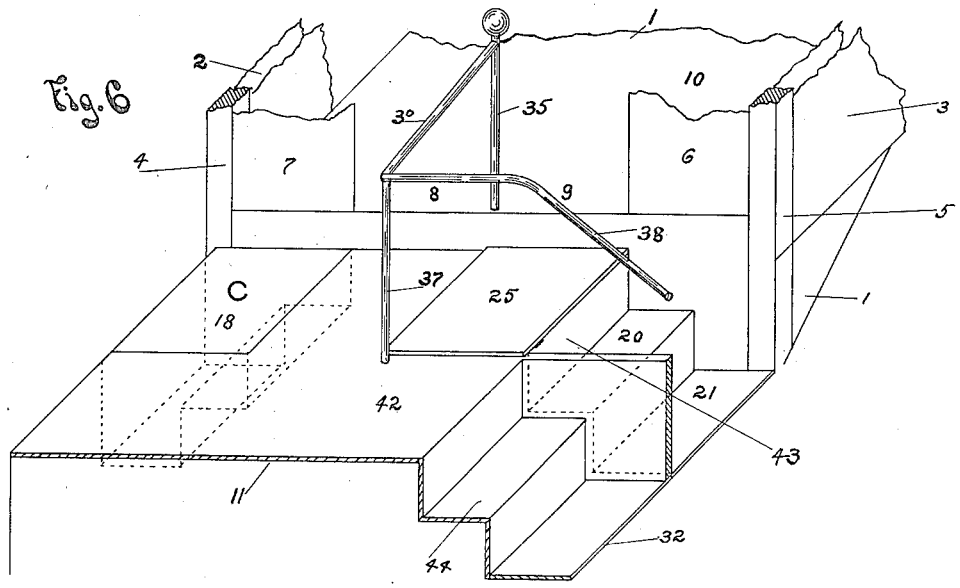
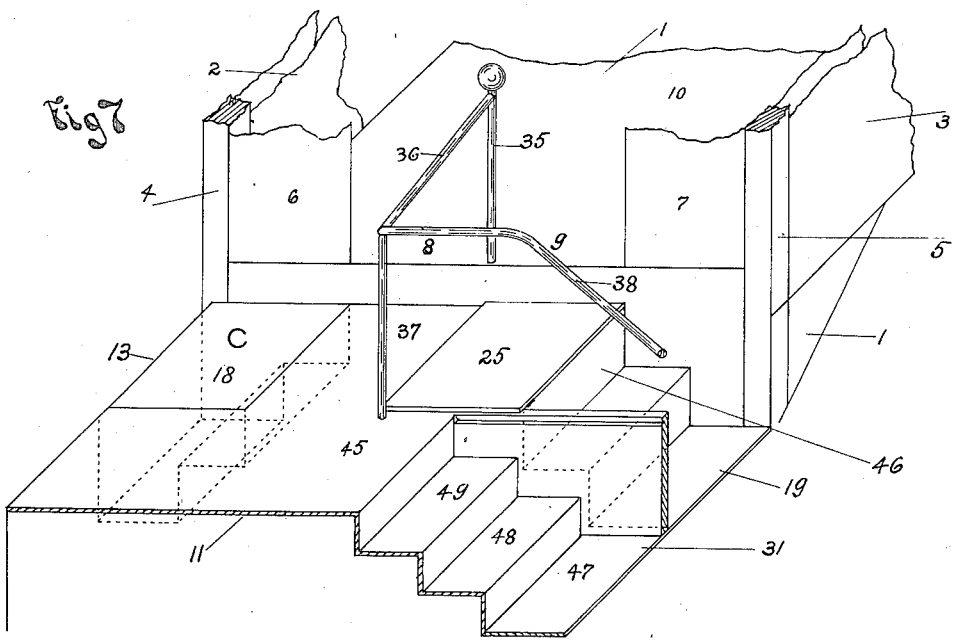
Witnesses
W. F. Woolard
N. E. Eccleston
Inventor
Charles Brewster Steele
Attorney

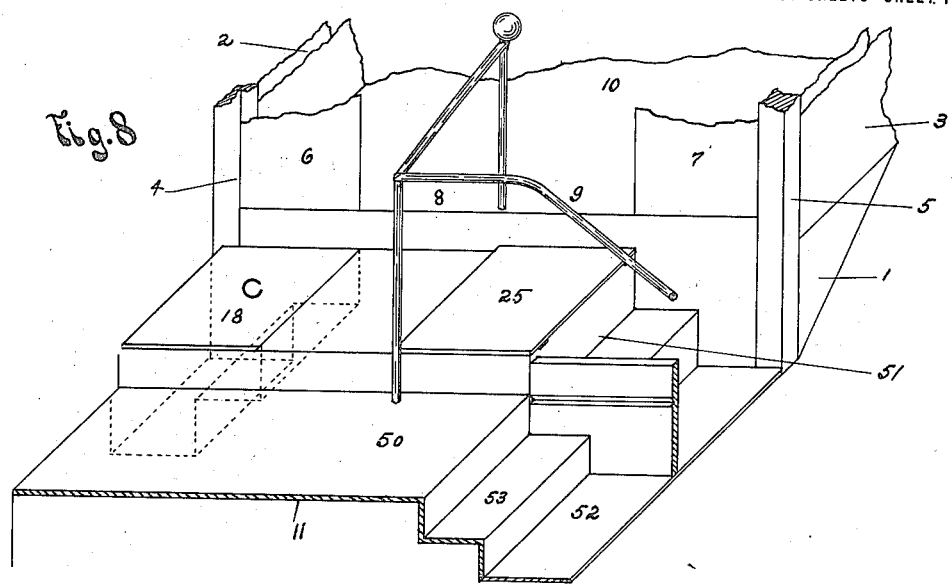
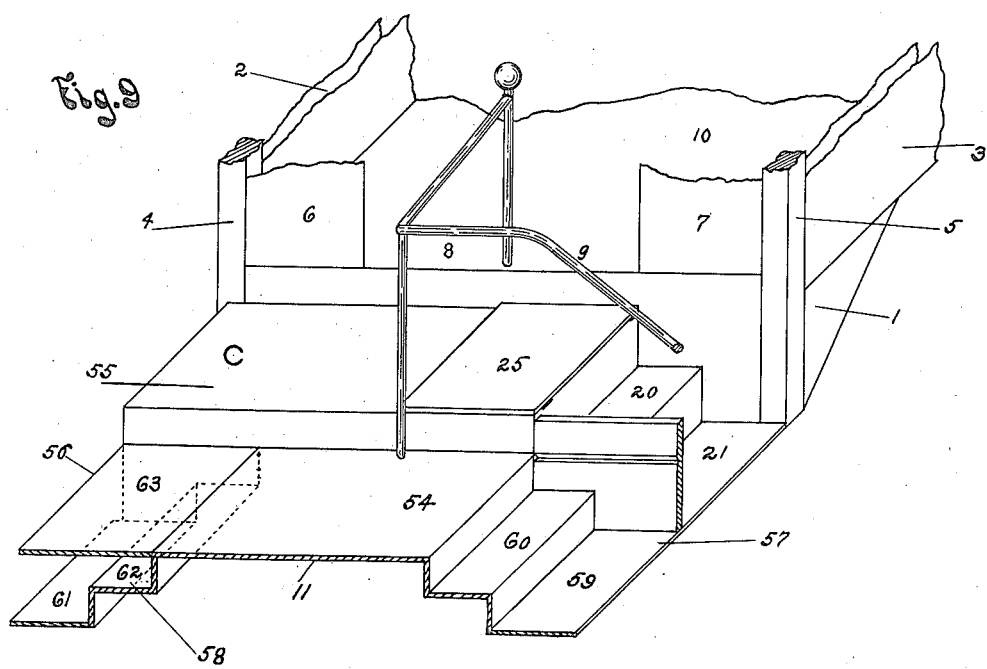

C. B. STEELE.
PASSENGER CAR.
APPLICATION FILED MAR. 24, 1917.
1,260,473.
Patented Mar. 26, 1918.
10 SHEETS—SHEET 8.
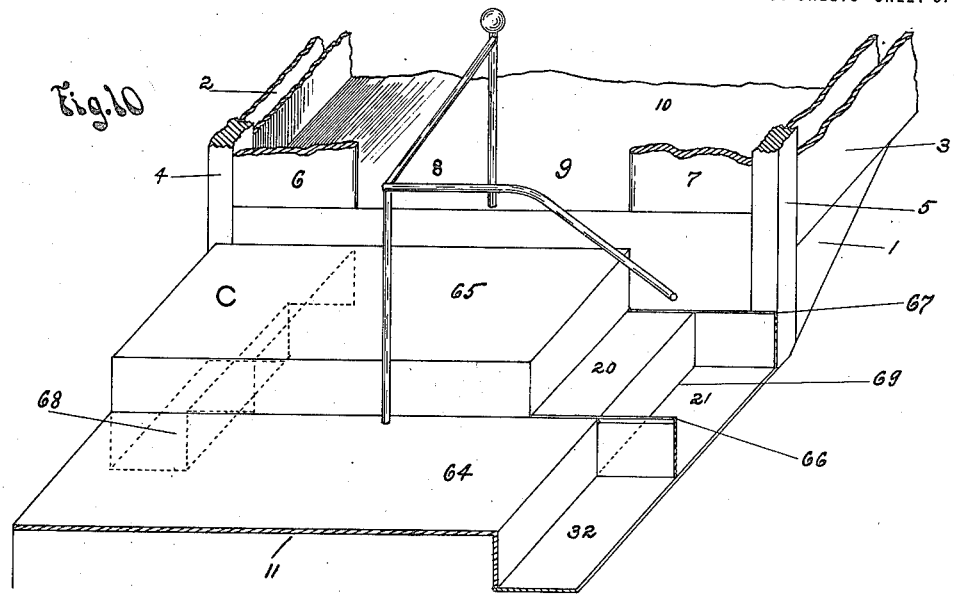
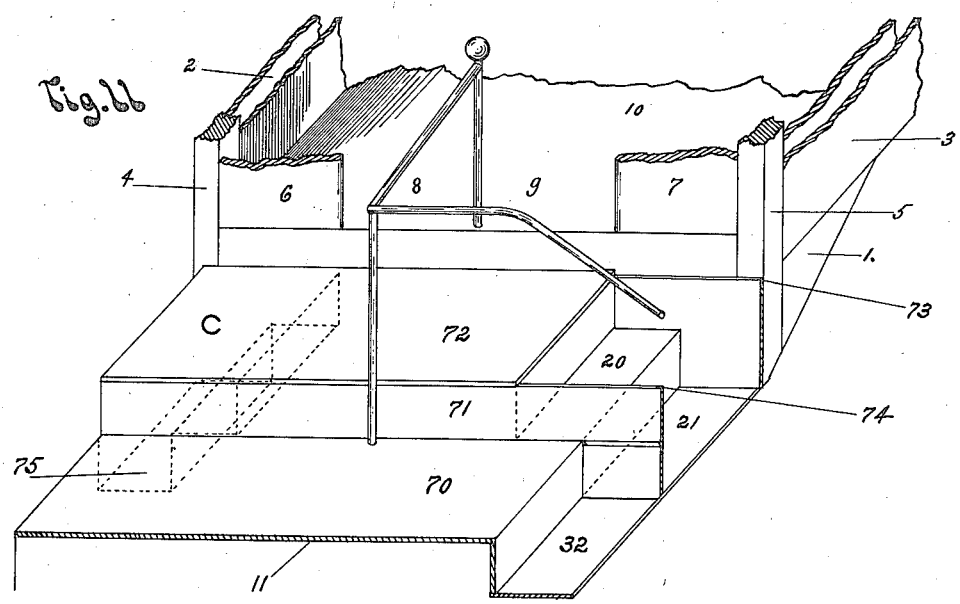

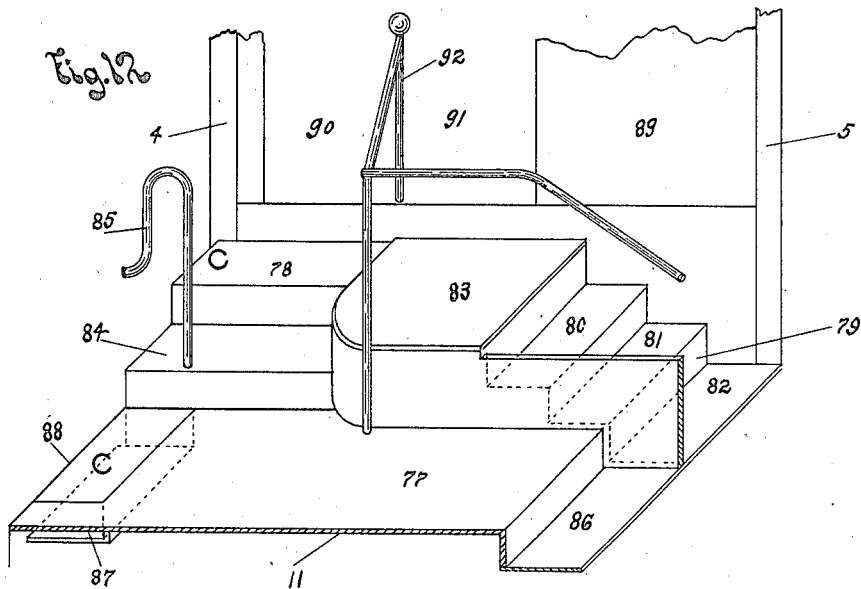
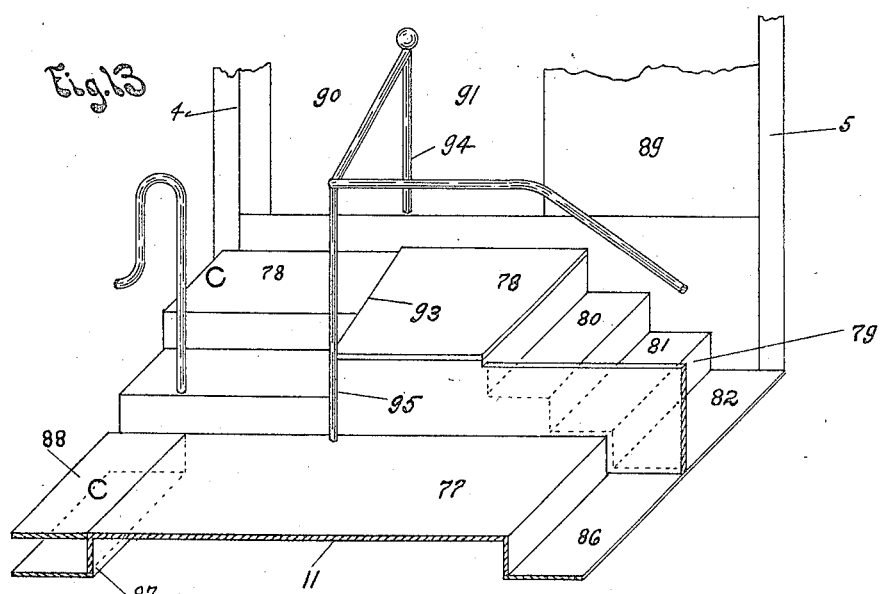

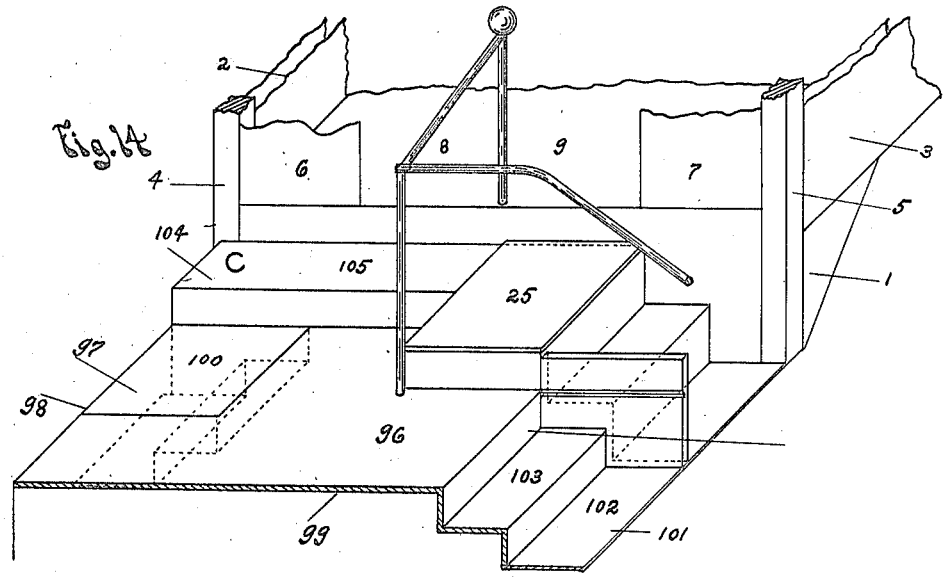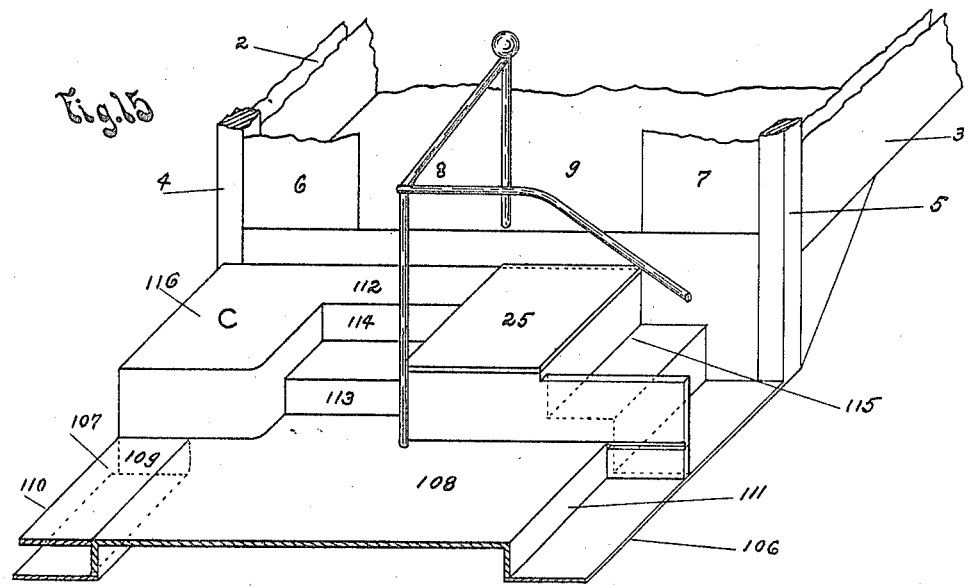

UNITED STATES PATENT OFFICE.

CHARLES BREWSTER STEELE, OF NEW YORK, N. Y.

PASSENGER-CAR.

1,260,473.　　　　　Specification of Letters Patent.　　Patented Mar. 26, 1918.

Application filed March 24, 1917.　Serial No. 157,082.

*To all whom it may concern:*

Be it known that I, CHARLES BREWSTER STEELE, a citizen of the United States of America, residing at New York, in the county of New York and State of New York, have invented certain new and useful Improvements in Passenger - Cars, of which the following is a specification.

My invention is a passenger car constructed to enable passengers to simultaneously enter and leave the car at one end, during the exit of passengers at the other end of the car, both ends of the car being duplicated, so that the car may travel in either direction with the same method of ingress and egress of passengers.

Another object of my invention is the provision of practical stairways, steps, and "landings" within the ingress and egress passageways that enable passengers to "board" the car, and to alight from the car, with ease, convenience, comfort, freedom from anxiety and apprehension, and protection from accident.

Another object of my invention is the provision of such distinctive ingress and egress passageways that passengers entering and leaving the car cannot obstruct, or their clothing interfere with one another.

Another object of my invention is the provision of steps for the ingress and egress stairways having exceedingly short step-risers, that enable aged or infirm passengers to enter and leave the car without exertion and with facility and confidence.

Another object of my invention is the provision of immovable ingress and egress steps that insure passengers from exposure to dangers and accidents incidental of the use of folding and movable steps.

Another object of my invention is the provision of the practically logical and ideal location of the conductor's station, whereby the conductor at all times occupies an elevated position that enables the conductor to have an unobstructed face view of incoming, outgoing, boarding, alighting, standing, and seated passengers without the conductor turning around or changing his position.

Another object of my invention is the provision of placing the conductor's station out of the path of passenger travel, but so located that the conductor while having his entire field of duty under visible control, is able to so readily collect fares, issue transfers, and command the operation of the car, that passengers must pass the conductor in "single file," thereby rendering the "missing of fares" impossible.

Another object of my invention is the provision of barriers so constructed and arranged that they combine the utility of separating ingoing and outgoing passengers and form "landing" rails and protective stair baluster.

Another object of my invention is the placing of the motorman's station so that the motorman is located at an elevation that places the track line at all times fully under his vision, while the barriers isolate the motorman from outgoing passengers and interference with the proper performance of his duties, and enable the safe acceleration of the exit of passengers from the front single exit passageway and staircase.

Another object of my invention is the entire elimination of steps, or other projections, protruding beyond the vertical plane of the side walls of the car that have heretofore caused serious accidents by the "side wiping" of passengers, pedestrians, and street traffic, by the sudden inadvertent or unintentional starting of a car.

Another object of my invention is the provision of movable trap covers that form floorways over the stairway wells and steps, and constitute the flooring of the conductor's station when the single exit stairway is closed to passengers, and a flooring for standing passengers when it is alternatively, desired to cover and close the opposite duplex exit stairway.

Another object of my invention is the provision of practical means by which the platform arranged for the occupancy of the conductor, and the platform arranged for the occupancy of the motorman, can each be instantly changed and converted with facility and convenience for the occupancy and utility of either the motorman or conductor, when it is desired to reverse the running direction of the car.

Another object of my invention is in so constructing and arranging the ingress stairway and the exit stairway for the disposition of their lowermost step at such a short distance from the surface of the roadway, that passengers are enabled to "step" on and "off" the car by slightly raising their feet, thereby providing low steps for the car, and at the same time preserving the size of trucks, wheels, springs, and distance from the rails to the car floor, of the standard large cars generally accepted as insuring the most efficient service, maintenance, and operation.

Another object of my invention being the economizing of every inch of the floor plan of the platform for practical and profitable utility, convenience, and comfort alike of passengers and the employees operating the car, and the provision that no matter how greatly passengers crowd upon the lower ingress "landing," they must pass the conductor in single file without intrusion, while the conductor occupies a commanding elevated position over the heads of incoming passengers, all of which is hereinafter described in the specification, specifically designated in the appended claims, and illustrated in the accompanying drawings, (accurately drafted to scale) "in which like characters represent like parts" in the different figures respectively.

Figure 1 is a side elevation of one end of the car and vestibuled platform, with part of the car body broken away, showing the duplex ingress and egress doorways in their closed positions when the motorman is occupying and performing his duties within the vestibule at this end of the car.

Fig. 2 is an elevation of the same side of the car and vestibuled platform shown in Fig. 1, with part of the car body broken away, showing the doors of the duplex ingress and egress doorways in open position, the immovable steps and "landings" of the duplex ingress and egress passageways, the place for the conductor's station on the cover over the closed front single exit stairway indicated at the farther side of the exit landing, the central dividing barrier, the front single exit door, and the partition into which the front single exit door is slidable.

Fig. 3 is an isometric perspective of one end of the car and vestibuled platform, with parts broken away, showing the exit "landing" with the hinged trap cover in closed position over and closing the single exit stairway forming the floor of the conductor's station, and the hinged trap cover of the duplex exit stairway in open position, its reverse surface forming the floor of the duplex exit passageway, with the duplex exit stairway exposed and open for passenger travel, the duplex exit car opening and the dividing rail and stair baluster barrier. The duplex ingress stairway is shown at a lower elevation of the platform, with its "landing" extending across the vestibule, and the ingress passageway leading to and over the portion of the exit "landing" intermediate the two exit stairways to the ingress car opening.

Fig. 4 is an isometric perspective, approximately the same view as Fig. 3, showing narrower stairway wells, with the exchangeable step well trap-cover, without hinges, covering the single exit stairway and well, and forming the floor of the conductor's station, and adapted to be, alternatively, translated, placed over, and form a cover and floor for the duplex exit stairway well; doors, partly broken away, shown in open position in the duplex ingress and egress doorways, a door in closed position in the single exit doorway, and barriers dividing the passageways and compelling passengers to pass the conductor's station in single file.

Fig. 5 is a sectional plan of one end of the car and vestibuled platform, with part of the car body broken away, showing the duplex ingress stairway and "landing" extending across the platform, the ingress doorway having its doors in open position. The exit "landing" elevated above the level of the ingress "landing," extending across the platform, and having an exit and steps at both ends thereof, barriers dividing the landings into separate ingress and egress passageways, with the barrier open at the entrance of the ingress passageway over the exit "landing," the duplex exit stairway and doors open for the exit of passengers, the single exit stairway at the opposite end of the exit "landing" closed by its door, the exchangeable trap-door covering the single exit stairway and forming the floor of the conductor's station, and the barriers forming dividing rails and stairway balusters.

Fig. 6 is an isometric perspective of a modification of one end of the car and vestibuled platform, showing the ingress and egress passageways on the same level, with an equal number of steps for all the stairways.

Fig. 7 is an isometric perspective of another modification of the end of the car and vestibuled platform, showing the ingress and egress passageways of the same level, with a number of steps with shorter steprisers for the ingress stairway, in excess of the steps of the egress stairways.

Fig. 8 is an isometric perspective of another modification of the end of a car and vestibuled platform, the ingress and exit "landings" at different levels, with increased width to the lower steps of the stairways, and the steprisers of the ingress stairway shorter than the step-risers of the exit stairways.

Fig. 9 is an isometric perspective of another modification of the end of a car and vestibuled platform, showing the different elevations of the ingress and exit landings, with the ingress and the single exit stairways opposite to one another, at each end of the lower landing, and having a larger plurality of steps than the steps of the duplex exit stairway.

Fig. 10 is an isometric perspective of another modification of the end of a car and vestibuled platform, showing the ingress and exit "landings" at different levels and the exit "landing" adapted to slide and alternatively cover either of the exit stairways.

Fig. 11 is an isometric perspective of another modification of the end of a car and vestibuled platform, showing the ingress and exit "landings" at different levels, and the floor of the exit "landing" adapted to slide and cover, alternatively either of the exit stairways.

Fig. 12 is an isometric perspective of another modification of the end of a car and vestibuled platform, showing the duplex ingress and exit "landings" at different levels, the ingress "landing" provided with a stairway at each end thereof, the exit "landing" having a stairway parallel the ingress stairway, and another stairway at right angles thereto with a rounded sill base adapted for the double purpose, alternatively, of ingress and egress of passengers, and the ingress and exit passenger openings at the end of the car body being located at the side thereof.

Fig. 13 is an isometric perspective of another modification of the end of a car and vestibuled platform, approximately the same view as Fig. 12, showing the right angled stairway for double use of ingoing and outgoing passengers with an inclined sill base.

Fig. 14 is an isometric perspective of another modification of the end of a car and vestibuled platform, showing the ingress and exit "landings" at different levels, the single exit stairway intermediate the length of the vestibuled platform at one side of the ingress "landing," and supplied with a trap-cover, flooring, interchangeable with, and for, alternatively, covering the ingress stairway, and a "landing" parallel the width of the car for both ingress and exit of passengers, with the conductor's station thereon.

Fig. 15 is an isometric perspective of another modification of the end of a car and vestibuled platform, showing the ingress and exit "landings" at different levels, the ingress and single exit stairways at the ends of the ingress "landing," the elevated conductor's station as part of the exit "landing," and the stairway therein at right angles to said exit "landing" intermediate the duplex exit and conductor's station.

The numeral, 1, represents the end of the car body, of any suitable construction, having its other end and parts broken away, the numerals, 2, and 3, representing the side walls, and 4, and 5, the end posts, of the car. The end of the car body is partly inclosed by the rectangularly disposed end barrier panels, 6, and 7, each extending from the end posts, 4, and 5, toward the central line of the car providing the opening divided into the ingress passenger opening 8, and the egress passenger opening, 9, which are each, preferably, twenty four inches in the clear, said panels, 6, and 7, also, forming seat ends, and guards for incoming and outgoing passengers, and the conductor's station, C, and these panel barriers being thirty two inches in height from the car floor, a clear view over these panels of the interior of the car is afforded the conductor, but any other type of partition and doorways may be provided for the end of the car. The numeral 10, represents the floor of the car body.

The divided platform, 11, preferably supported by knees, extends from the end of the car body, and is, preferably, inclosed by a vestibule, but is adapted to be constructed without vestibule inclosure. Depressed at suitable distance below the car flooring at the end of the car body is located the "exit landing," 12, whose floor level is thus "one step" below the car floor level, and is provided at one of its ends with the exit stairway, 13, whose immovable steps, 14, and 15, lead to the door, 16, slidable within the partition, 17, said stairway, 13, being covered, when not in use as the front single exit, by the hinged trap-cover, 18, the surface of which forms the floor of the conductor's station, C, when this front single exit, 13, is thus closed to passengers, such elevated position of vantage affording the conductor at all times a clear vision of incoming, outgoing, standing, and seated passengers, and an important employment and economizing of the space over the stairway for advantageous utility. At the other and opposite end of this "exit landing," 12, is a duplicate, or similar, stairway, 19, provided with the immovable steps, 20, and 21, leading to the sectional folding doors 22 and 23, of their exit doorway, 24, said stairway, 19, being provided with the hinged trap-cover, 25, which is, similarly, folded over and upon that part of the "landing," 12, designated by 26, the reversed surface of the trap-cover, 25, serving as the floor of the passageway for passengers leaving the car by the exit, 24, both surfaces of both covers, 18, and 25, forming floorings in either of their alternatively reversed positions. These hinged covers, 18, and 25, are, also, so constructed that when reversely folded over and upon the landing, 12, they extend from the top riser of each of the egress stairways, 13, and, 19, to and under the central line of the dividing barrier rail, 36, their reversed surfaces thus, alternatively, forming smooth, unobstructed floorings over the entire area of each of such exit passageways for the safe footway of passengers.

Depressed at a level one step below the exit landing, 12, and extending parallel therewith and adjacent thereto, is the ingress landing, 27, that is provided with the doorway, 28, the sectional folding doors, 29, and, 30, the stairway, 31, and the immovable step, 32, leading over the landing, 27, to and over that part of the landing, 12, designated by 33, to the ingress car opening, 8, thereby forming the ingress passageway and means for passengers to "board" the platform and pass into the body of the car. The steps of the ingress and the exit stairways are, preferably, on equal levels with each other to accord the best facility of their comfortable use, and conformity of step-risers, and lowermost steps are, preferably, disposed at a minimum short-riser distance above the road rail, R, or surface of the roadway, thereby providing the most desirable average height for convenience and ease in stepping on and off of traction cars, and by giving, for instance, all step-risings a 10⅜ (inch) rise for a four step elevation, the standard car measurement of forty one and one half inches can be maintained between the road rail and main flooring of the car body, but the number and size of steps, and the height of step-risers, can be adjusted to any suitable scale and form of construction for standard or special car dimensions without departing from the broad principle, spirit, and intent of my invention.

Extending across the platform, parallel to, and at the line of division between the landings, 12, and, 27, and conformable therewith, is a cross plate, made of metal, or other suitable material, secured to and forming a strengthening tie and brace for the platform and its supports, not shown, but the subject of my separate application for car underframe, filed March 24, 1917, Serial Number 157,081, the riser, 34, being the equivalent disclosed herein.

The post, 35, centrally divides the space between the barrier panels, 6, and 7, to form the openings 8, and 9, and connects with the rail, 36, extending to the post, 37, from which extends a declining rail baluster, 38, secured to the jamb-post, 39, that divides the duplex ingress and egress doorways of the divided platform, thereby separating the ingress and exit duplex passageways, the reverse direction of travel by passengers therethrough being indicated, respectively, by the reversed arrows. The post, 40, and rail, 41, shown in Fig. 4, form a protective barrier for the conductor's station, C, or for the stairway, 13, when said stairway, 13, is not covered by the trap-cover 18, the connective rail, 42, thence providing the telescopic barrier across the passageway between the posts, 37, and, 40, to, alternatively, "shut-off" the motorman's station, M, during the periods that passengers make their exit by way of the exit-stairway, 13.

When the direction of the car is reversed, and the car is traveling in the opposite direction, the doors 22, 23, 29, and 30, are closed, the trap-cover, 25, is swung over in position to form a floor over the stairway, 19, thus closing both the ingress entrance, 28, and egress exit, 24, when the trap-cover 18, is then folded over upon that part of the landing, 12, designated by 33, its reverse surface serving as the floor and portion of landing, 12, designated by, 33, thence becomes the front exit passageway, leading to the exit stairway, 13, steps, 14, and 15 and front single exit doorway 16, whereupon the entire platform, 11, has been thus converted from a "rear-platform" to a "front-platform," and the single exit, 13, is open for passengers leaving the car by way of the front exit, 13, and the motorman's station, M, is ready for occupancy by the motorman to operate the car, while, vice versa, a reverse operation immediately converts the duplicate platform at the other end of the car into condition for its occupancy, use and management by the conductor, and the ingress and egress of passengers.

In Figs. 4, and 5, are shown modifications of the trap-cover, 18, to illustrate its interchangeable translation, to form, alternatively, the cover and flooring for either of the stairways, 13 or 19, and also, the extension and increased length of the landing, 12, conformable in area between the stairways, 13, and, 19, by any suitable and desirable decrease or increase of the width of the steps.

In Fig. 6 is shown a modification of my invention in which the "ingress landing," 42, and the "exit landing," 43, are both at the same level, and all the stairways containing an equal number of steps, the stairway, 31 being provided with the additional step, 44.

In Fig. 7 is shown another modification of my invention with the "ingress landing," 45, and "exit landing," 46, of the same level, with exit stairways, 13, and 19, having equal number of steps, and the ingress stairway, 31, provided with the short-riser steps, 47, 48, and, 49.

In Fig. 8, is shown another modification of my invention with the ingress landing, 50, and exit landing, 51, at different levels, the ingress landing, 50, having a plurality of short riser-steps, 52, and 53.

In Fig. 9 is shown another modification of my invention with the "ingress landing," 54, and "exit landing," 55, at different levels, the "ingress landing," 54, having at its opposite end the exit, 56, both the ingress stairway, 57, and "exit-stairway," 58, being provided with an equal number of short-riser steps, 59, and 60, 61, and 62, the trap-cover, 63, being translatably interchangeable to cover, alternatively, either of the stairways, 57, or 58, and the conductor's station, C, on the end of the elevated landing 55.

In Fig. 10 is shown another modification of my invention with the ingress landing, 64, and exit landing, 65, at different levels, and the exit landing, 65, adapted to be slid upon the rails, 66, and 67, to alternatively, cover either of the exit stairways, 68, or 69, respectively.

In Fig. 11 is shown another modification of my invention with the ingress landing, 70, and exit landing, 71, at different levels, with the floor, 72, of the exit landing, 71, adapted to be slid upon the rails, 73, and 74, to alternatively, cover either of the exit stairways, 75, or 76, respectively.

In Fig. 12, is shown another modification of my invention with the ingress landing, 77, and exit landing, 78, having different elevations, the exit stairway, 79, having a plurality of short-riser steps, 80, 81, and 82, the exit landing, 83, extending beyond the central plane of the car, having a rounded casing adjacent the stairway, 84, which is located at right angles to the exit stairway, 79, said stairway, 84, being adapted for the passage, alternatively, of both the ingoing and outgoing passengers, the barrier, 85, guarding stairway, 84, the ingress landing, 77, having the ingress step 86, at one end thereof, and the exit step, 87, at the end opposite thereto, provided with the trap-cover, 88, interchangeable, alternatively, to cover either step 86, or step 87, and the partition, 89, is located at one side of the end of the car body, and extending toward the central line of the car a sufficient distance to position the ingress opening, 90, and the egress opening 91, divided by the post, 92, similarly, at the opposite side of the end of the car body, at any suitable distance intermediate the end posts, 4, and, 5.

In Fig. 13, is shown another modification of my invention, approximately, the same as Fig. 12, but with a straight line casing, 93, inclining at an angle to and from the barrier posts, 94, and, 95.

In Fig. 14, is shown another modification of my invention providing additional floor space for the ingress landing, 96, the exit, 97, with its stairway, 98, being located intermediate the length of the car platform, 99, the trap-cover, 100, being interchangeable, alternatively, to cover either the stairway, 98, or the ingress stairway, 101, provided with short riser steps, 102, and, 103, the narrowed landing, 104, providing the conductor's station, C, and stair-case-passage, 105, for the alternative, passage of both ingoing and outgoing passengers.

In Fig. 15, is shown another modification of my invention providing a one step entrance, 106, and one step exit, 107, respectively, at each end of the ingress landing, 108, the trap-cover, 109, being adapted to, alternatively, cover either the stairway, 110, or 111, the stairway, 112, having the short riser steps, 113, and, 114, being located at right angles to the exit stairway, 115, the conductor's station, C, being located on the elevated abutment of landing, 116, in front of which station, C, ingoing and outgoing passengers, alternatively, pass in both directions.

The modifications disclosed embrace the same fundamental elements that comprise the cardinal principles shown by Figs. 1, 2, 3, 4, and 5, of the preferred form, the breadth and scope of my invention being readable upon all views of the drawings, and likewise interpreted by the specification and claims.

The manifold advantages of this car, are shared, alike, by the passengers, conductor, motorman, and its operating company. Duplicated vestibuled platforms at each end of the car providing the conductor's station and the passenger entrance at the rear end of the car, and the motorman's station at the front end of the car, insures the only logical and best practical traction railway operative results, the ingress and egress passageways having stairways furnished with short-riser immovable steps, whose lowermost steps are located at a short distance above the surface of the roadway, enabling passengers, including the aged and infirm, to accessibly "step on," "step off," enter, and leave the car with the greatest facility, ease, comfort, and safety, and with complete absence of apprehension, calculation, and exertion, the staircases and barriers, also, guarding incoming and outgoing passengers and their clothing from contact with one another. The fixed, firm, immovable steps insure a confident and certain foothold, while all the steps being wholly within the vertical plane of the side walls of the car extended, the dangers and accidents due to the use of precarious protruding and folding steps are eliminated.

The conductor's station, C, posited over the exit stairway opening that is trap-covered when such exit is closed to passenger use, is, not only, an important economy of platform space, but gives the conductor, from his elevated position, a commanding face view of the platform, car interior, incoming, outgoing, standing, and seated passengers without turning around, or changing his posture, the necessity of all passengers passing the conductor in single file insuring the collection of all fares, thus reducing the conductor's cares and distractions, simplifying his labors and duties, and affording more time for his intelligent management of the car.

The motorman's station, M, provides the motorman a commanding position and comprehensive vision of the trackway and surroundings, increased space, comfort, and isolation from interference with his duties, the protective front stairway with its safe, immovable, easily descendible short-riser steps requiring merely his perfunctory supervision of outgoing passengers and intendance of the front exit door, thereby conserving his mind and energies for concentration and attention of the important operation of the car.

The railway company derives the advantages and benefits of ideal service, schedules, maintenance, and operation, quick loading, unloading, transportation, safety, and satisfaction of passengers, the practical elimination of accidents and their resultant disasters, perplexities, expensive litigation, and damages, decrease of losses, increase of earnings, freedom from anxieties and apprehensions, gratification of its patrons, and the friendly attitude of the public, while, both sides of the vestibule being modeled and finished of identical shape and configuration, with the partition and single-exit-doorway simulating and representing in appearance the opposite duplex-ingress and egress-doorways, both sides of both vestibules and the car have the same ornate, symmetrical, handsome, and conservative aspect, the entire car thus conforming to general standard design.

What I claim to be my invention, is:

1. A car having a body portion provided with a platform at the end thereof, landings on the platform each located at a different elevation, and passageways leading over the landings to openings at both sides of the landings.

2. A car having a body portion provided with a platform at the end of the body portion, landings on the platform each located at an elevation different from that of the elevation of any other landing, openings at both sides of the platform, and steps leading from the landings to the openings.

3. A car having a body portion, a platform extending from the body portion, and ingress and egress stairways located on the platform provided with covers, alternatively, covering and uncovering the stairways.

4. A car having a body portion, a platform extending from the body portion, ingress and egress passageways to and from the car body leading to both sides of the platform, stairways for the passageways, provided with means for, alternatively, covering the stairways.

5. A car having a body provided with a platform consisting of landings, each landing located at a different elevation, a landing having exit steps at both sides of the platform and a landing having ingress steps at a side of the platform.

6. A car having ingress and egress passageways leading to openings at both sides of the car, provided with landings having different levels, the distance between the different levels of the landings forming step-risers of the ingress and egress passageways.

7. A car body having a platform provided with landings, each landing located at a different elevation, openings at both sides of the platform, ingress and exit steps at both sides of the platform wholly within the vertical plane of the side walls of the car body extended.

8. A car having a body provided with a platform extending therefrom, landings on the platform each landing located at a different elevation, steps at both ends of a landing, steps at a side of a landing, the steps of all landings located wholly within the vertical plane of the side walls of the car body extended.

9. A car having a body portion provided with extensions therefrom each extension having a different elevation, immovable steps leading from both ends of an extension, and immovable steps leading from an end of another extension.

10. A car having a body portion, a platform extending from the body portion, landings on the platform, passageways over the landings, stairways extending from the landings provided with immovable steps, and adjustable covers for the stairways.

11. A car having a body portion, a platform extending from the body portion, landings on the platform, passageways over the landings, stairways extending from the landings, provided with immovable steps, adjustable covers for the stairways, a stairway cover forming a station for the conductor.

12. A car having a body portion, a platform extending from the body portion, landings on the platform, passageways over the landings, stairways extending from the landings, an adjustable covering for the stairways, alternatively, providing a station for the conductor, or a floorway for passengers.

13. A car having a body portion provided with a plurality of extensions therefrom each extension having a different elevation, steps leading from both ends of an extension to both sides of the car, steps leading from an end of an extension to a side of the car, thereby positing all lowermost steps within minimum stepping distance from the traction-rails without decreasing or increasing the distance between the body portion of the car and the traction-rails.

14. A car having a body portion of standard construction provided with a plurality of extensions therefrom each extension having a different elevation, steps leading from both sides of an extension to both sides of the car, steps leading from the side of an extension to one side of the car, thereby positing all lowermost steps within minimum stepping distance from the traction-rails without changing the standard construction of the body portion of the car.

15. A car having a body portion, a platform extending from the body portion provided with an opening at both sides thereof, a plurality of landings on the platform each having a different elevation provided with passageways and steps leading to the openings, all lowermost steps having a common elevation.

16. A car having a body portion, an extension at the end of the body portion, a plurality of divided landings having different elevations provided with steps alternatively covered by an adjustable flooring.

17. A car having a body portion, a platform at the end of the body portion, an ingress stairway at a side of the platform, duplicate exits on each side of the platform provided with stairways, a stairway being alternatively closed by adjustable covers forming floorings.

18. A car having a body portion, a platform extending therefrom provided with ingress and egress passageways over the platform, ingress and egress steps at a side thereof, and ingress steps at an opposite side thereof, covers provided with floor surfaces on both sides thereof alternatively covering steps or covering passageways, the floor surface of a cover completely covering and extending entirely across the floor surface of a passageway when not covering steps.

19. A car having a body portion, a platform at the end of the body portion, duplex ingress and exit steps on one side of the platform, exit steps on the opposite side of the platform, means alternatively providing a flooring over either of the exit steps.

20. A car having a body provided with a platform having passageways thereon, barriers extending across portions of the end of the body providing openings above and adjacent thereto, the space above the barriers permitting clear vision to and from the car body and platform over the barriers.

21. A car having a body portion and platform at the end thereof, barriers between the body portion and platform extending from each side of the car to an ingress and egress opening, openings above the barriers permitting a clear vision over and beyond the sills of the barriers.

22. A car having a body portion, a platform at the end thereof, exit steps on each side of the platform wholly within the vertical plane of the side walls of the car extended, ingress steps on one side of the platform wholly within the vertical plane of the side walls of the car extended, and covers alternatively forming floorings over either of the exit steps.

23. A car having a body portion, provided with a platform at the end thereof, landings on the platform, passageways over the landings leading to steps wholly within the vertical plane of the side walls of the car extended, and a conductor's station alternatively located over steps.

24. A car having a body portion and platform at the end thereof, a conductor's station on the platform, barriers between the body portion and platform, an ingress and egress opening between the barriers, the barriers being so constructed that the conductor has a clear vision over the barriers of the interior of the body portion.

25. A car having a body portion, a platform at the end of the body portion whose floor space consists of landings provided with steps for the ingress and egress of passengers, and covers alternatively providing a conductor's station over a portion of the steps.

26. A car having a body portion, a platform at the end of the body portion whose floor space consists of landings provided with steps for the ingress and egress of passengers, and hinged covers alternatively providing floors over steps for a conductor's station, or for the egress of passengers.

27. A car having a body portion, barriers dividing the end of the body portion into ingress and egress openings, a platform divided into ingress and egress passageways provided with steps, a cover alternatively forming a conductor's station over steps of an egress passageway, a vestibule for the platform provided with openings and doors completely enveloping all steps when the vestibule doors are closed.

28. A car having a body portion, a platform at the end of the body portion, ingress and egress passageways over the platform, steps on the platform adapted for alternative use, adjustable covers for steps alternatively providing a conductor's station over steps when such steps are alternatively not in use.

29. A car having a body portion, a platform at the end of the body portion, ingress and egress passageways over the platform, steps on the platform adapted for alternative use, portably adjustable covers for steps alternatively providing a conductor's station over steps when such steps are alternatively not in use.

30. A car having a body portion, a plurality of landings over the platform provided with pluralities of stairways each having a plurality of steps with unequal step risers for the ingress and egress of passengers.

31. A car having a body portion, provided with a platform having ingress and egress landings at different elevations for the egress and ingress of passengers, exit steps at each end of the higher elevated landing, and ingress steps at an extremity of the lower elevated landing.

32. A car having a body portion provided with a platform having ingress and egress landings at different elevations for the ingress and egress of passengers, exit steps at each end of the higher elevated landing, and ingress steps at an extremity of the lower elevated landing, the lowermost steps of the landings having a short step rise above the surface of the roadway.

33. A car having a body portion provided with a platform having a plurality of landings of different elevation for the ingress and egress of passengers, exit steps at each end of a landing, ingress steps at an end of another landing a station for the conductor, a station for the motorman, the platform being convertible for alternative occupancy by either the conductor or the motorman.

34. A car having a body portion, an opening at the end of the body portion, a platform extending from the body portion, landings on the platform, the higher elevated landing having exits from each end thereof, the lower elevated landing having an entrance at an end thereof, a station for the conductor on a landing, and a station for the motorman on another landing.

35. A car having a body portion, an opening at the end of the body portion, a platform at the end of the body portion, a landing provided with exits having a conductor's station thereon, a landing provided with an entrance having a motorman's station thereon, the landings having different elevations.

36. A car having a body, a platform extending from the body, a conductor's station on the platform, passageways over the platform provided with stairways, and movably operative coverings alternatively covering or uncovering stairways, the covering of a closed stairway forming the conductor's station.

37. A car having a body, a platform extending from the body, a plurality of passageways over the platform provided with stairways, means forming adjustable floorings to cover the stairways, means for adjustably covering and uncovering a plurality of stairways for the passage of passengers, means to cover a stairway to form the flooring of a conductor's station over a stairway when a stairway is closed against the passage of passengers.

38. A car having a body provided with a platform extending therefrom having ingress and egress passageways and stairways, covers for the stairways movably invertible to close and unclose the stairways, a conductor's station on the cover of a closed stairway, passageways on inverse surfaces of the covers.

39. A car having a platform at the end thereof, passageways at different levels, steps for the passageways, covers for the steps provided with floor faces on both surfaces of the covers.

40. A car having a body, a platform extending from the body, ingress and egress passageways leading from the body to a side of the platform ending in steps wholly within the vertical plane of the side walls of the car extended, an egress passageway leading from the body to an opposite side of the platform ending in steps wholly within the vertical plane of the side walls of the car extended, covers for the steps, a cover unclosing the steps of a passageway during time that another cover forms the floor of the conductor's station and closes the steps of a passageway.

41. A car having a platform at the end of the car, ingress and egress passageways ending at a side of the platform, an egress passageway ending at an opposite side of the platform, step wells provided with steps ending the passageways, lids covering and uncovering step wells, a lid forming the floor of the conductor's station when covering a step well during time that a lid is uncovered from over another step well.

42. A car having a platform at the end of the car, ingress and egress passageways of the car, ingress and egress passageways ending at a side of the platform, an egress passageway ending at an opposite side of the platform, step wells provided with steps ending the passageways, lids covering and uncovering step wells, a lid forming the floor of the conductor's station when covering a step well during time that a lid is uncovered from over another step well, all step wells and steps being located wholly within the vertical plane of the side walls of the car extended.

In testimony whereof I hereby affix my signature in the presence of two witnesses.

CHARLES BREWSTER STEELE.

Witnesses:
C. M. STALEY,
J. T. JOHNSON.